(12) United States Patent
Doucet et al.

(10) Patent No.: US 9,131,219 B2
(45) Date of Patent: Sep. 8, 2015

(54) METHOD AND APPARATUS FOR TRIANGULATION-BASED 3D OPTICAL PROFILOMETRY

(71) Applicant: INSTITUT NATIONAL D'OPTIQUE, Québec (CA)

(72) Inventors: Michel Doucet, Saint-Augustin-de-Desmaures (CA); Michel Robert, Québec (CA); Daniel Lefebvre, Québec (CA)

(73) Assignee: INSTITUT NATIONAL D'OPTIQUE, Québec, Quebec (CA)

( * ) Notice: Subject to any disclaimer, the term of this patent is extended or adjusted under 35 U.S.C. 154(b) by 489 days.

(21) Appl. No.: 13/718,585

(22) Filed: Dec. 18, 2012

(65) Prior Publication Data

US 2014/0168368 A1    Jun. 19, 2014

(51) Int. Cl.
*H04N 13/02* (2006.01)
*G01B 11/25* (2006.01)

(52) U.S. Cl.
CPC ............ *H04N 13/02* (2013.01); *G01B 11/2518* (2013.01)

(58) Field of Classification Search
CPC ............................ G01B 11/2518; H04N 13/02
USPC .......................................................... 348/46
See application file for complete search history.

(56) References Cited

U.S. PATENT DOCUMENTS

| | | | |
|---|---|---|---|
| 5,056,922 A * | 10/1991 | Cielo et al. | 356/604 |
| 5,812,269 A * | 9/1998 | Svetkoff et al. | 356/602 |
| 5,995,650 A * | 11/1999 | Migdal et al. | 382/154 |
| 6,624,899 B1 * | 9/2003 | Clark | 356/614 |
| 7,075,662 B2 * | 7/2006 | Hallerman et al. | 356/604 |
| 7,460,250 B2 * | 12/2008 | Keightley et al. | 356/625 |
| 7,495,758 B2 * | 2/2009 | Walton | 356/237.1 |

OTHER PUBLICATIONS

Blais, "A Review of 20 Years of Range Sensor Development", Journal of Electronic Imaging, Jan. 2004, pp. 231-243, vol. 13 (1), NRC.
R. G. Dorsch et al., "Laser triangulation: fundamental uncertainty in distance measurement", Applied Optics, Mar. 1994, pp. 1306-1314, vol. 33, No. 7, Optical Society of America.

(Continued)

*Primary Examiner* — Christopher S Kelley
*Assistant Examiner* — Deirdre Beasley
(74) *Attorney, Agent, or Firm* — Fasken Martineau DuMoulin

(57) ABSTRACT

A method for determining a centerline for a triangulation-based optical profilometry system, compensating for the spatial variations of the reflectance of an object's surface. The method comprises providing a luminous line on the object, the luminous line being a triangulation line superposed with a compensation line; capturing an image of the triangulation line and of the compensation line; for each position along the imaged triangulation line, determining a transverse triangulation profile from the imaged triangulation line and a transverse compensation profile from the imaged compensation line; determining a transverse correction profile given by the reciprocal of the transverse compensation profile; multiplying the transverse triangulation profile with the transverse correction profile to obtain a corrected transverse triangulation profile; computing a center of the corrected transverse triangulation profile. The centers determined at positions along the triangulation line form the centerline. Embodiments of a triangulation-based optical profilometry system integrating the method are disclosed.

9 Claims, 9 Drawing Sheets

(56) References Cited

OTHER PUBLICATIONS

Curless et al., "Better optical triangulation through spacetime analysis", IEEE International Conference on Computer Vision '95, Jun. 1995, pp. 987-994.

F. Riechert et al., "Low-speckle laser projection with a broad-area vertical-cavity surface-emitting laser in the nonmodal emission regime", Applied Optics, 2009, pp. 792-798, vol. 48, No. 4, Optical Society of America.

* cited by examiner

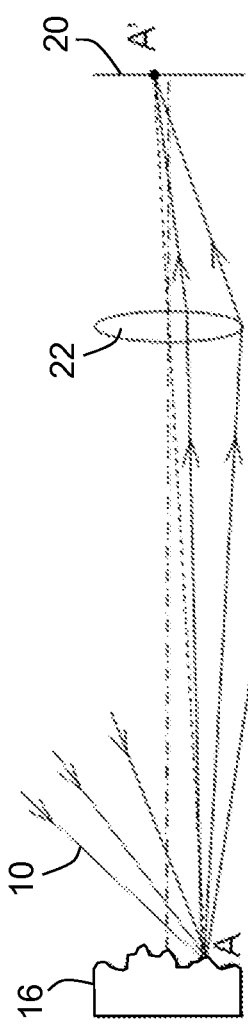
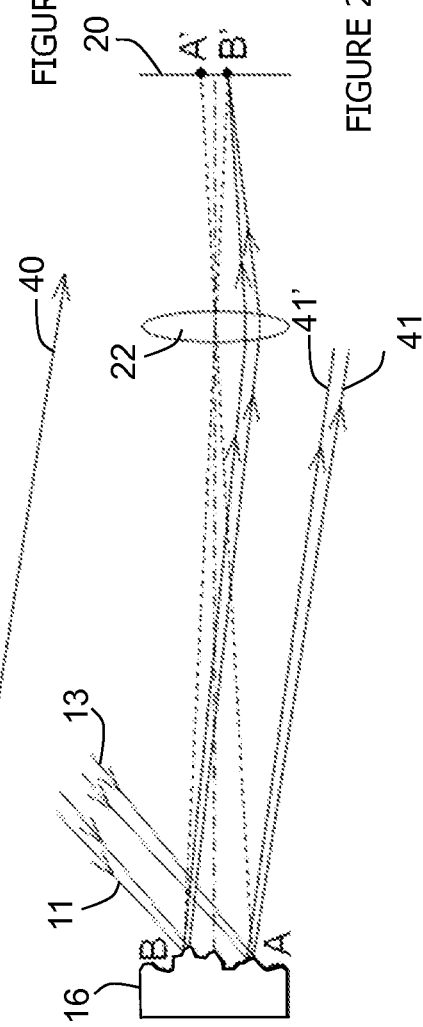
FIGURE 2A (PRIOR ART)
FIGURE 2B (PRIOR ART)

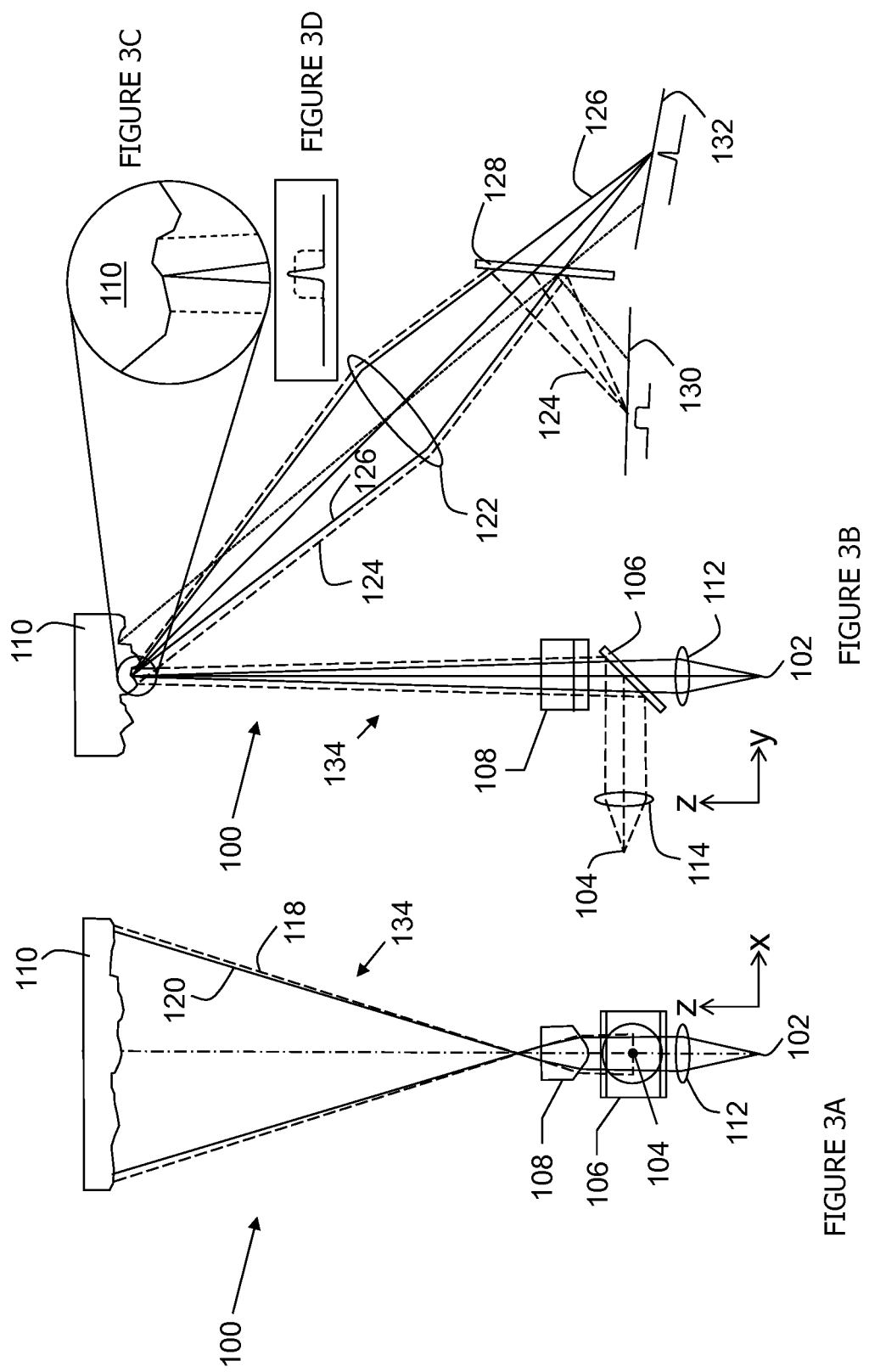

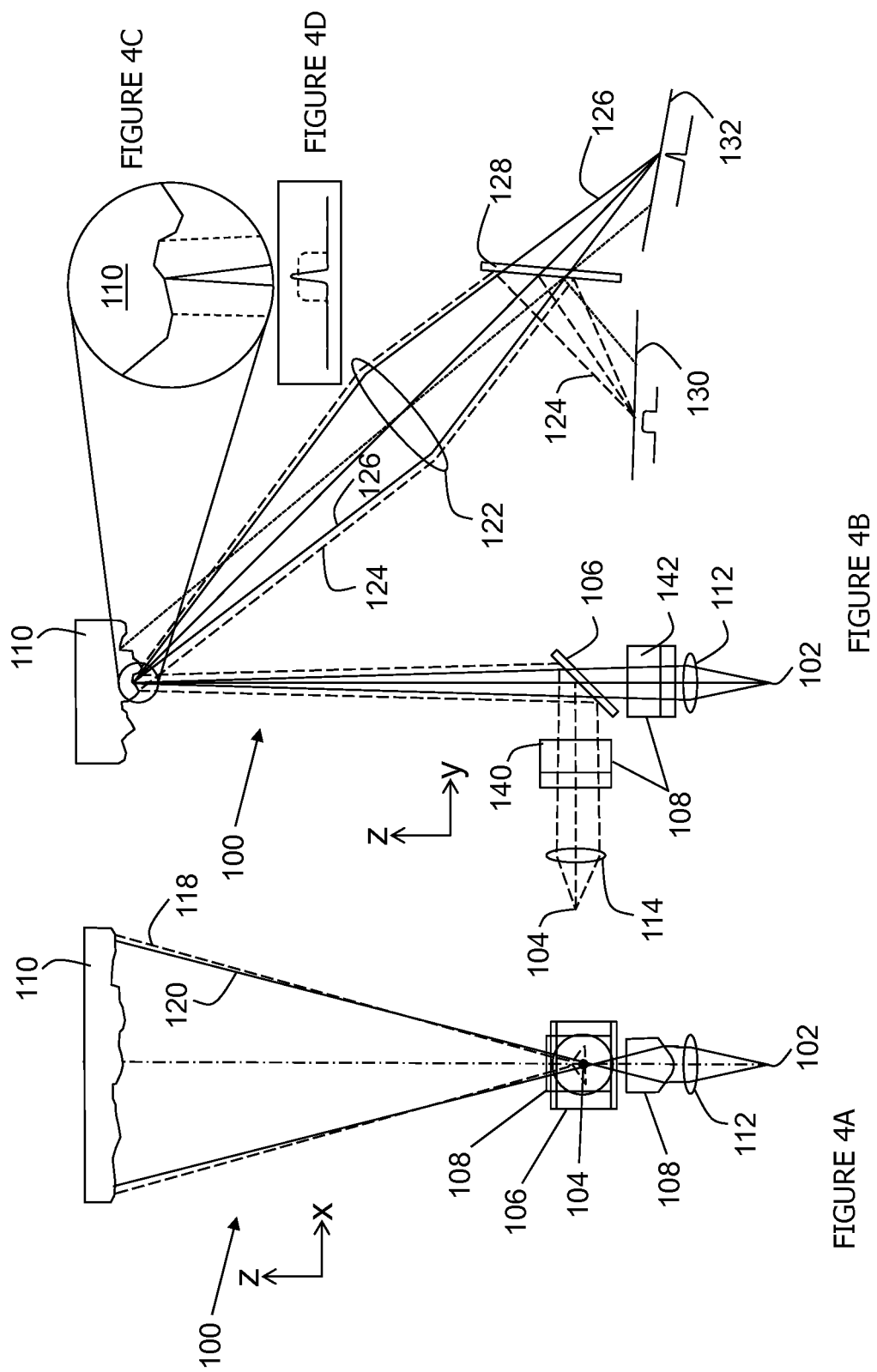

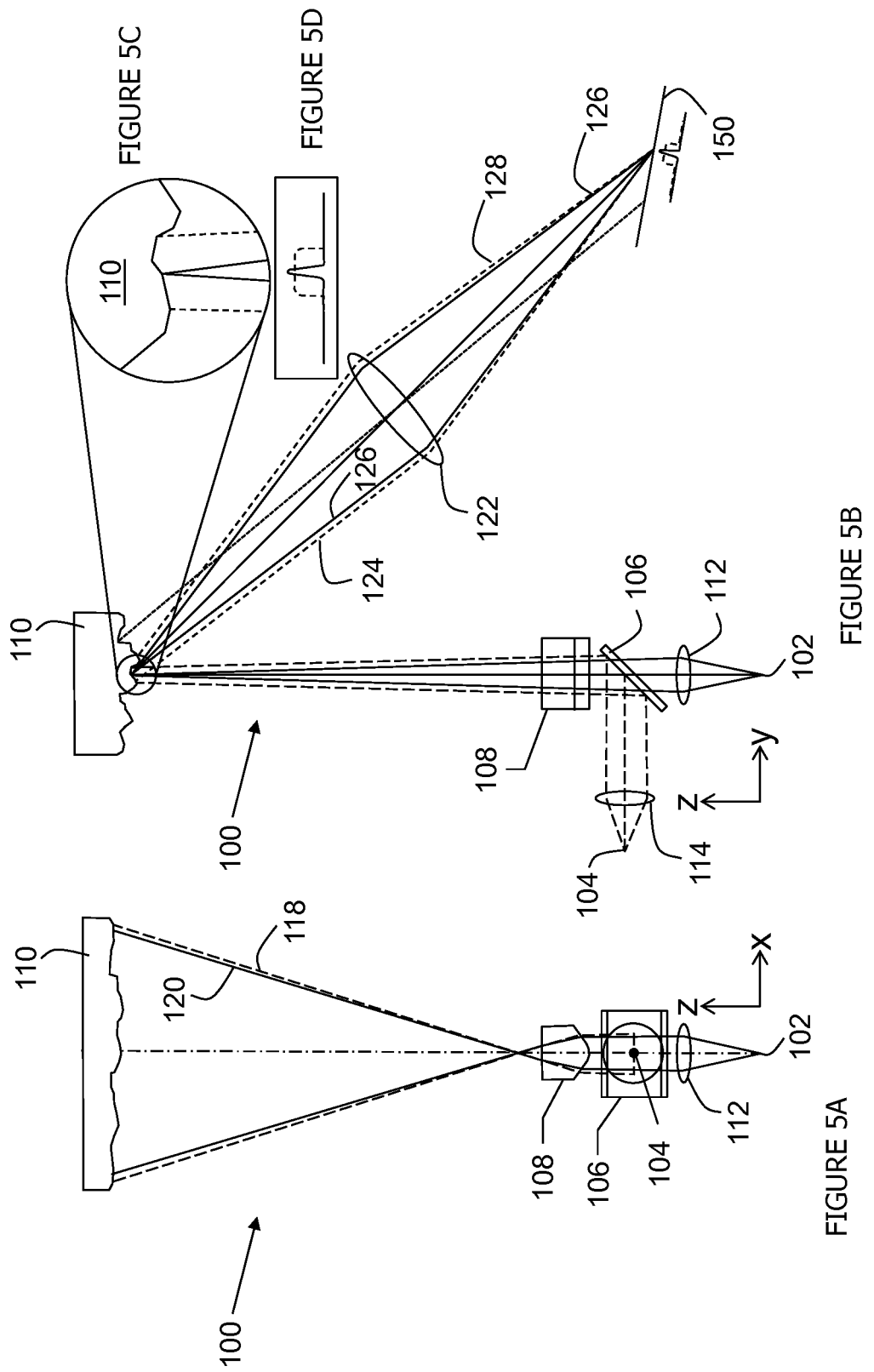

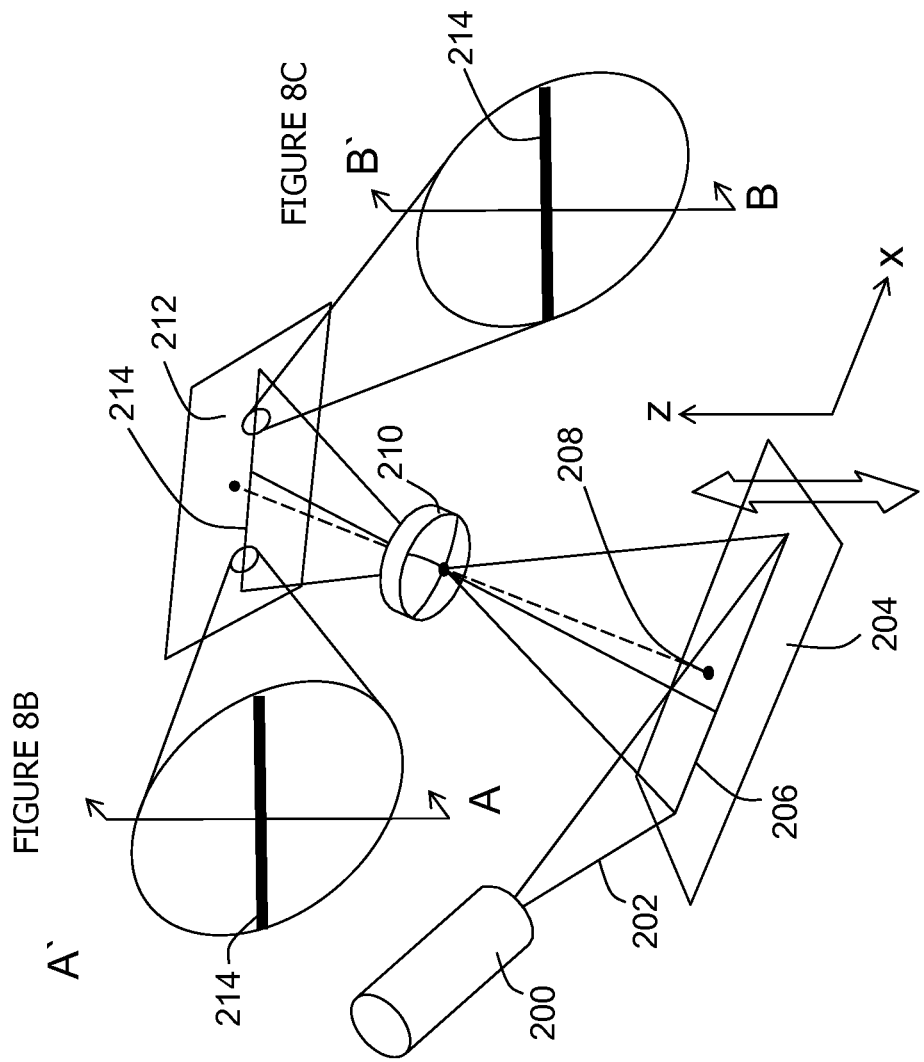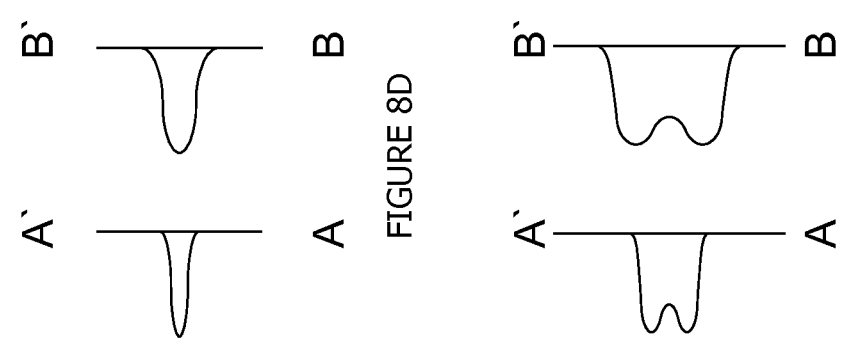

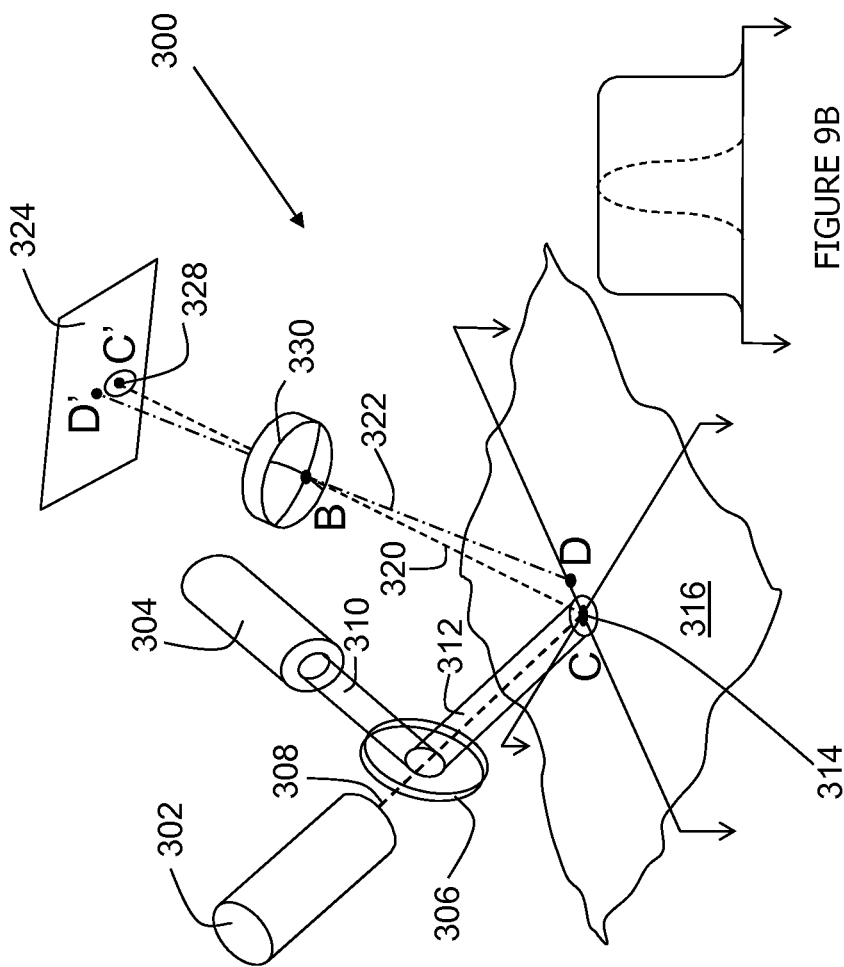

METHOD AND APPARATUS FOR TRIANGULATION-BASED 3D OPTICAL PROFILOMETRY

TECHNICAL FIELD

The invention relates to the determination of the centerline of a triangulation-based 3D optical profilometry system with compensation for the spatial variations in the reflectance of the surface of the object to be scanned using such a system.

BACKGROUND OF THE ART

A variety of optical metrology techniques have been developed for non-contact mapping in three dimensions of the surface profile and shape of objects and their subsequent conversion into digital data. Techniques based on optical triangulation have found a widespread use and they are currently implemented in three-dimensional (3D) optical mapping (profiler) instruments available from various vendors. A popular type of triangulation-based 3D profiler instruments, sometimes referred to as slit scanners, includes a light projector that projects a fan-shaped illumination light beam on the surface of the object to be mapped.

In accordance with the principle of optical trigonometric triangulation, a camera captures images of the luminous line formed on the object by the light beam. A large portion of an object can be mapped by capturing a set of images at a suitable frame rate while the object is translated relative to the projected fan-shaped light beam. Alternatively, the object can be kept immobile while the projected light beam is swept over the object along a direction perpendicular to the luminous line.

Depending on factors such as the width of the fan-shaped light beam illuminating the object, the magnification of the camera objective lens and the size of the photosensitive elements (pixels) of the image sensor of the camera, the digital images of the luminous line will not be infinitely thin, their minimum widths being ultimately limited by the size of each individual pixel of the image sensor. Note that the term "width" refers herein to the smallest dimension (thickness) of the luminous line, the other dimension being referred to as the line length. One processing step in high-resolution optical 3D profiling is the determination of the centerline in the image of each luminous line. The expression "centerline" is understood herein to refer to the imaginary, infinitely-thin continuous line constructed from the succession of points that pass through the "center" of the width of an imaged luminous line. Various methods can be used for computing the centerline of an imaged luminous line, one of the most popular being the computation of the first moment (also referred to as the center of gravity, the center of mass or the centroid) of the brightness (irradiance) profile along the width of the line.

In this regard, it should be noted that the brightness of the image of a luminous line is neither perfectly uniform along the width of the line nor bounded by well-defined, steep edges. In fact, the brightness along this direction is generally better described by the well-known bell-shaped Gaussian function, which is largely determined by the typically Gaussian irradiance profile along the width of the fan-shaped light beam that illuminates the object. Ideally, the brightness variations along the width of a line would resemble to a smooth, symmetrical Gaussian profile having a well-defined center peak value that can serve to define the centerline at any position along the length of the imaged line. Likewise, this ideal situation means that the Gaussian brightness profile would be wide enough to cover several pixels of the image sensor anywhere along the length of the imaged line. Unfortunately, in real-life situations the Gaussian-shaped line brightness often appears as more or less distorted, leading to difficulties in determining the centerline, and then to surface profiling of an object with reduced accuracy.

A source of distortions in the otherwise Gaussian-shaped brightness profile along the width of the imaged luminous line originates from fine-pitch (small-scale) variations of the optical reflectance characteristics (also known as the texture) of the object's surface that occur on a scale that compares to the width of the fan-shaped illumination light beam in the plane of the object. These variations in the reflectance of the object's surface can corrupt the optical irradiance distribution of the light reflected by the surface and then captured by the camera objective lens to form the image of the luminous line.

The presence of even very small areas of the object's surface that reflect light in a specular manner, such as a mirror-like flat surface, can cause the reflection of a portion of the illumination light along directions that point out of the field of view of the camera. As a consequence, zones of lower brightness can be created in the images of a luminous line, these zones being potential sources of errors in the determination of the centerline. The problem can get even worse with mirror-like surface areas inadvertently oriented to reflect the illumination light right into the camera's field of view. In this situation the higher brightness of the specularly-reflected light can cause blooming of some camera pixels and then clipping of the center part of the Gaussian-shaped brightness profile along the line width. Note that fine-pitch variations of the optical reflectance are also present on the surface of an object having a nonhomogeneous composition, obtained from example by aggregating solid materials of various natures, as it is observed in many mineral rock samples. In this case, even a very fine polishing of the object surface cannot eliminate the small-scale nonuniformities in the surface reflectance.

Various methods for reducing the detrimental effects of the small-scale surface reflectance variations of the objects sensed by triangulation-based 3D profilers have been proposed in the prior art. Some techniques use a beam shaping optical element such as a holographic diffuser placed at a distance in front of the imaging sensor to redistribute and homogenize the reflected beam irradiance as it gets focused on the image sensor. The beam shaping element then serves to remove unwanted structures from the reflected light that falls on the image sensor as well as to enlarge the size of the imaged spot, thus allowing presumably more accurate estimates of the center position of the spot.

The use of a holographic optical diffuser can be thought of as an optical low-pass filtering of the reflected light before it reaches the photosensitive surface of the camera sensor. However, this low-pass filtering action can also be performed numerically on the digital images generated by the camera.

The brightness profiles along the line width are often irregular Gaussian profiles and attempting to locate the centerline by finding the position (pixel) of the maximum brightness value is not adequate for high-resolution 3D measurements. Line-splitting methods which consist in using a patterned light projector (projecting a series of parallel lines) and shifting the pattern (by a fraction of a line width) at two different positions to create slightly-displaced pairs of luminous parallel lines on the object can be used. The shift is small enough to allow the distorted Gaussian irradiance profiles along the width of both lines to partially overlap in the images formed on the camera sensor. The centerline is then located with enhanced accuracy by subtracting one profile from the other to obtain a composite brightness profile that includes both positive and negative amplitudes. The composite brightness profile also gets a null amplitude value at some pixel position, this position being used to define the centerline. The better accuracy in locating the centerline comes from the fact that the slope of the composite brightness profile at the zero-amplitude crossing point is twice that of each original Gaussian profile at this position.

Various methods for computing the centerline of a line imaged on a camera sensor are available in the prior art. Each centerline value can be accompanied by a quality factor computed to provide cues to alert a user that the data may be suspect. In a simple form, the quality factor may merely indicate whether the maximum brightness value along the line width is within acceptable levels. Alternatively, the quality factor may be an indication of the width of the Gaussian brightness profiles (relative to the pixel size) or it may quantify the degree of symmetry of the profiles. A lack of symmetry clearly indicates the presence of a corrupted Gaussian brightness profile.

By their very nature, a large proportion of the methods of the prior art developed for compensating for the detrimental effects of the small-scale variations of the surface reflectance of an object under inspection does not account for the specific way any given Gaussian brightness profile gets distorted when impinging on the object surface. In other words, several methods of the prior art process all brightness profiles in exactly the same manner, no matter the profiles may present minute distortions or large ones.

There is therefore a need for triangulation-based 3D profilers of the slit-scanner type capable of providing high-resolution measurements via appropriate compensation for the small-scale surface reflectance characteristics of an object.

SUMMARY

According to one broad aspect of the present invention, there is provided a method for determining a centerline for a triangulation-based optical profilometry system, compensating for the spatial variations of the reflectance of an object's surface. The method comprises providing a luminous line on the object, the luminous line being a triangulation line superposed with a compensation line; capturing an image of the triangulation line and of the compensation line; for each position along the imaged triangulation line, determining a transverse triangulation profile from the imaged triangulation line and a transverse compensation profile from the imaged compensation line; determining a transverse correction profile given by the reciprocal of the transverse compensation profile; multiplying the transverse triangulation profile with the transverse correction profile to obtain a corrected transverse triangulation profile; computing a center of the corrected transverse triangulation profile. The centers determined at positions along the triangulation line form the centerline.

According to another broad aspect of the present invention, there is provided a method for determining a centerline for a triangulation-based optical profilometry system. The method compensates for the spatial variations of the reflectance of a surface of an object to be scanned with the triangulation-based optical profilometry system. The method comprises providing a luminous line on the surface of the object, the luminous line being a superposition of a triangulation luminous line generated by a triangulation light beam with a compensation luminous line generated by a compensation light beam, the triangulation light beam and the compensation light beam being collinear, the triangulation light beam having a lower étendue than the compensation light beam, the triangulation light beam having a nearly Gaussian irradiance profile along a transverse dimension; capturing a triangulation image of the triangulation luminous line, the triangulation image including an imaged triangulation luminous line; capturing a compensation image of the compensation luminous line, the compensation image including an imaged compensation luminous line; for each of a plurality of different positions defined along a length of the imaged triangulation luminous line, determining a transverse triangulation profile from the imaged triangulation luminous line; determining a transverse compensation profile from the imaged compensation luminous line; determining a transverse correction profile by calculating the reciprocal of the transverse compensation profile; multiplying the transverse triangulation profile with the transverse correction profile to obtain a corrected transverse triangulation profile; computing a center of the corrected transverse triangulation profile and storing the center in a vector; and determining the centerline for the triangulation-based optical profilometry system from the vector.

In one embodiment, providing the luminous line includes projecting the luminous line, wherein the triangulation light beam is emitted by a triangulation light projector and the compensation light beam is emitted by a compensation light projector.

In one embodiment, the triangulation light beam and the compensation light beam are combined using a beam combining element.

In one embodiment, the triangulation light beam and the compensation light beam are emitted according to a time-multiplexing scheme.

In one embodiment, the triangulation light beam and the compensation light beam have different center wavelengths.

In one embodiment, the capture of the triangulation image comprises optically filtering the triangulation image to reject the imaged compensation luminous line from the triangulation image, and the capture of the compensation image comprises optically filtering the compensation image to reject the imaged triangulation luminous line from the compensation image.

In one embodiment, the optical filtering of the imaged compensation luminous line and the optical filtering of the imaged triangulation luminous line are performed using a spectrally-selective beamsplitter.

In one embodiment, the capture of the triangulation image and the capture of the compensation image are performed using respective triangulation image sensor and compensation image sensor.

In one embodiment, the capture of the triangulation image and the capture of the compensation image are performed using a single image sensor according to a time-multiplexing scheme controlling the single image sensor.

According to another broad aspect of the present invention, there is provided a triangulation-based optical profilometry system that provides a centerline compensated for the spatial variations of the reflectance of a surface of an object to be scanned with the system. The system comprises at least one projector for providing a luminous line on the surface of the object, the luminous line being a superposition of a triangulation luminous line generated by a triangulation light beam with a compensation luminous line generated by a compensation light beam, the triangulation light beam and the compensation light beam being collinear, the triangulation light beam having a lower étendue than the compensation light beam, the triangulation light beam having a nearly Gaussian irradiance profile along a transverse dimension; a triangulation image sensor for capturing a triangulation image of the triangulation luminous line, the triangulation image including an imaged triangulation luminous line; a compensation image sensor for capturing a compensation image of the compensation luminous line, the compensation image including an imaged compensation luminous line; a processing unit for determining the centerline from a vector containing a center evaluated at each of a plurality of different positions defined along a length of the imaged triangulation luminous line, the center being computed from a corrected transverse triangulation profile obtained by multiplying a transverse triangulation profile with the reciprocal of a transverse compensation profile, the transverse triangulation profile being determined from the imaged triangulation luminous line, and the transverse compensation profile being determined from the imaged compensation luminous line.

In one embodiment, the at least one projector is two projectors, the two projectors including a triangulation light projector emitting the triangulation light beam and a compensation light projector emitting the compensation light beam.

In one embodiment, the system further comprises a beam combining element to combine the triangulation light beam and the compensation light beam.

In one embodiment, the system further comprises a projector controller for controlling the at least one projector according to a time-multiplexing scheme to emit the triangulation light beam and the compensation light beam.

In one embodiment, the triangulation light beam and the compensation light beam have different center wavelengths.

In one embodiment, the system further comprises a spectrally-selective beamsplitter for optically filtering the triangulation image to reject the imaged compensation luminous line from the triangulation image, and for optically filtering the compensation image to reject the imaged triangulation luminous line from the compensation image.

In one embodiment, the triangulation image sensor and the compensation image sensor are provided by a single image sensor, the single image sensor being controlled by a controller according to a time-multiplexing scheme.

The term "étendue" coming from the French language will be used throughout this specification to define a figure of merit of a light beam, wherein this figure of merit can be thought of as being proportional to the product of the beam's angular spread (also known as the beam's divergence) with the minimum transverse beam size. As a result, this parameter bears strong resemblance with some other factors of common use in the field of laser beam propagation, such as the Beam Parameter Product (BPP) or the beam quality factor $M^2$. Note that the étendue differs from both factors mentioned above mainly by the fact that the beam's angular spread and minimum beam size are defined over a transverse plane rather than along a single transverse direction. The beam angular spread is then expressed in units of solid angle while the minimum beam size corresponds to the minimum transverse beam area, also known as the beam waist area. The étendue has the interesting property of remaining unchanged as a light beam propagates in free space or through a lossless optical system.

BRIEF DESCRIPTION OF THE DRAWINGS

Having thus generally described the nature of the invention, reference will now be made to the accompanying drawings, showing by way of illustration example embodiments thereof and in which:

FIGS. 2A and 2B (Prior Art) illustrate the distortions on the irradiance profiles captured by a camera and caused by the small-scale reflectance variations over the object surface, in the case of an illumination light beam of larger étendue (FIG. 2A) and for a light beam of lower étendue (FIG. 2B);

FIGS. 3A and 3B show side views of an example configuration for the compensated triangulation system. FIG. 3C shows a close-up view of both triangulation and compensation light beams impinging on the surface of an object, and FIG. 3D depicts schematically the transverse irradiance profiles of both light beams in the plane of the object's surface;

FIGS. 4A and 4B show side views of an alternative example configuration for the compensated triangulation system in which a pair of cylindrical optical components is inserted in the beam paths, downstream to the dichroic beamsplitter. FIG. 4C shows a close-up view of both triangulation and compensation light beams impinging on the surface of an object, and FIG. 4D depicts schematically the transverse irradiance profiles of both light beams in the plane of the object's surface;

FIGS. 5A and 5B show side views of another alternative example configuration for the compensated triangulation system in which the optical collection channel includes only one image sensing device. FIG. 5C shows a close-up view of both triangulation and compensation light beams impinging on the surface of an object, and FIG. 5D depicts schematically the transverse irradiance profiles of both light beams in the plane of the object's surface;

FIG. 8A shows an example set-up for carrying out the calibration of an optical triangulation system with sampling of the transverse irradiance profiles of the compensation light beam. FIGS. 8B and 8C are close-up views of short segments of the image of the luminous line for two locations along the length of the line while FIGS. 8D and 8E illustrate how the shapes of the transverse profiles of the triangulation (FIG. 8D) and compensation (FIG. 8E) light beams may change when moving from a location (A) to another (B) along the length of the luminous line;

FIG. 9A shows an example system for carrying out the compensated optical triangulation with a flying-spot scanner device. FIG. 9B illustrates schematically examples of the transverse irradiance profiles of the triangulation (dashed line) and compensation (solid line) light beams, the profiles being taken along cross sections of the light spot generated on the surface of an object to be mapped with the optical triangulation system.

It will be noted that throughout the appended drawings, like features are identified by like reference numerals.

DETAILED DESCRIPTION

Figure 1:
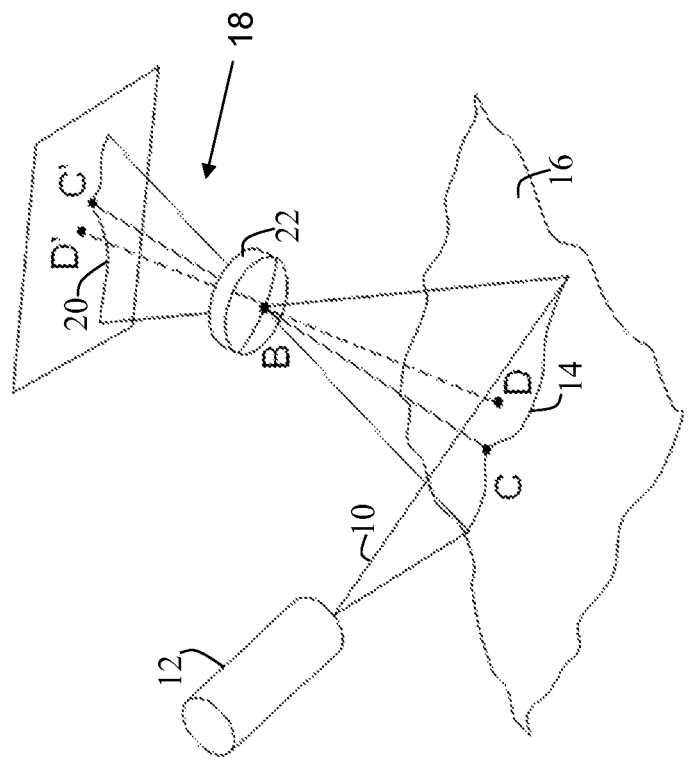
FIG. 1 (Prior Art) illustrates the principle of operation of a slit scanner system.

FIG. 1 (Prior Art) illustrates the principle of operation of an optical triangulation system (or 3D optical profiler) of the slit-scanner type. A fan-shaped light beam 10 spans outwardly along a single transverse direction to form a thin triangularly-shaped sheet of light as it propagates out of the light projector 12. As a result, the fan-shaped light beam 10 generates a luminous line 14 when it impinges on the surface 16 of an object. As shown in FIG. 1, the line 14 does not generally appear as a straight line since it is more or less distorted according to the topological features (gross shape, surface roughness and irregularities) in the zone illuminated by the line. In accordance with the principle of optical trigonometric triangulation, a camera 18 captures images 20 of the luminous line 14 formed on the object, the camera 18 being located and oriented so that the optical axis of its objective lens 22 makes an angle θ (not shown in FIG. 1) with the center optical axis of the fan-shaped illumination light beam 10.

Assuming that the object surface 16 extends horizontally, the local variations Δz in height within the illuminated zone of the object surface 16 are detected by the presence of corresponding lateral shifts Δx in the images 20 of the luminous line. The deviations Δz and Δx are linked through the fundamental triangulation relationship, which invokes parameters such as the angle θ between the optical axes of the light projector 12 and the objective lens 22 and the magnification M of the objective lens 22.

As illustrated in FIG. 2 (Prior Art), the presence of even very small areas of the object surface 16 that reflect light in a specular manner, similarly to a mirror-like flat surface, can cause the reflection of a portion of the illumination light beam 10 along directions that point out of the field of view of the camera. This is the case for the light rays 40 reflected off point A in FIG. 2A. As a consequence, zones of very low brightness can be created in the images 20, such as in the region surrounding image point A'. These darker zones can be sources of errors in the determination of a centerline. As shown in FIG. 2B, this error can get worse with the use of illumination light beams 11, 13 of low étendue, such as those emitted by many types of laser sources. Laser beams can often be thought of as pencils of light rays that propagate nearly parallel to each other, thus resulting in a lower étendue. The reflected light rays 41 and 41' are directed out of the field of view of the camera lens 22, so that the brightness of the image A' of point A on the object surface 16 can be much lower than that of the image point B'.

The processing of a brightness (irradiance) profile distorted from the action of the phenomenon described in the previous paragraph would benefit from the previous knowledge of the local optical reflectance characteristics of the object under inspection. This knowledge could be used to correct the distorted irradiance profiles in a nearly individualized manner, thus favoring a better recovery of their undistorted Gaussian shape and then to more accurate determinations of the centerline along the whole length of the imaged luminous line. This recovery process will be referred to as "compensation" throughout this specification.

Implementing a compensation method in 3D optical profilers could be useful in a variety of applications of these instruments. In particular, the method could be useful in applications that call for acquisition/processing rates of about 2000 luminous lines per second while requiring that each individual line be made up of more than 1000 sample data points. Such highly demanding applications are common in the field of 3D inspection of aircraft engine parts, wherein measurement resolutions in the range of ±5 μm are keenly sought.

In the proposed example method, the 3D optical profiling with compensation for the small-scale spatial variations of the surface reflectance of an object under inspection is carried out by illuminating the object with a dual-beam configuration. This configuration relies on the use of two separate fan-shaped light beams having similar propagation characteristics. A first light beam, denoted throughout the present disclosure as the triangulation light beam, is used for profiling the surface of the object according to the well-known optical triangulation approach. In turn, a second light beam, referred to as the compensation light beam, is used for recording the variations of the local reflectance within the zone illuminated by the triangulation light beam. The recorded reflectance map then serves for compensation of the optical profiling data.

FIGS. 3A and 3B show two distinct side views of an example configuration for the proposed system sketched for the XZ and YZ planes, respectively. Both planes refer to an XYZ Cartesian coordinate system having its Z axis oriented to make it parallel to the general propagation axis of both triangulation and compensation light beams. The dot-dashed line in FIG. 3A depicts this axis. The optical 3D triangulation system 100 includes two light projectors. Hence, a first light projector 102 emits the triangulation light beam 120 (with its contour depicted in solid line) while the second light projector 104 emits the compensation light beam 118 (dashed line). Both triangulation and compensation light beams are superposed using a beam combining element 106 such as a dichroic beamsplitter to generate a composite light beam 134, which will be referred from here on to as the illumination light beam. Alternatively, a polarizing beamsplitter or a fiber-optic beam combiner could be used as the beam combining element 106. Both triangulation 120 and compensation 118 light beams are fan-shaped, and they impinge on the surface of the object 110 to generate what would be perceived as a single luminous line (not shown in FIG. 3) on this object. In FIG. 3A, the line extends along the transverse X direction, that is, along the direction parallel to the plane of the figure and perpendicular to the propagation axis Z.

As best illustrated in FIG. 3B, the triangulation system 100 may include lenses 112 and 114, each having suitable focal length and clear aperture. The purpose of lenses 112 and 114 is to condition both triangulation and compensation light beams so that their transverse irradiance profiles in the plane of the object 110 have the desired width (or thickness). Here, the wording "width" refers to the size of the beam irradiance profiles along the transverse Y direction in FIG. 3B. FIG. 3D shows a close-up view of the irradiance profiles of both light beams along the Y direction. For simplicity, a beam irradiance profile along the Y direction will be referred to as a transverse irradiance profile.

The first and second light projectors 102 and 104 emit light beams 120 and 118 having center wavelengths $\lambda_T$ and $\lambda_C$. Here, the subscripts T and C stand for triangulation and compensation, respectively. In one embodiment, the wavelengths $\lambda_T$ and $\lambda_C$ differ from each other. Any suitable combination of center wavelengths $\lambda_T$ and $\lambda_C$ can be selected, provided that the wavelengths are matched to the spectral transmission/reflection characteristics of the selected beam combining element 106. For example, $\lambda_T$ can be chosen at 650 nm (red visible light) while $\lambda_C$ can be set at 530 nm (green visible light). Both center wavelengths $\lambda_T$ and $\lambda_C$ lie within the spectral response curve of the light-sensitive material from which the image sensors of the triangulation system 100 are made, as discussed in further details below. Laser sources can be integrated in both light projectors 102 and 104 for emission of monochromatic light beams with reduced étendue. In an alternative embodiment, broadband light sources are used, their wider emission spectra contributing to effectively wash out speckle patterns commonly observed when using highly-coherent laser light. As a result, high-power light-emitting diodes (LEDs) and superluminescent light-emitting diodes (SLEDs) can be used in the triangulation system 100.

Beside its center wavelength $\lambda_C$, the compensation light beam 118 differs from the triangulation light beam 120 mainly by the fact that its transverse irradiance profile in the plane of the surface of the object 110 is wider than that of the triangulation light beam.

FIGS. 3C and 3D clearly illustrate how the widths of both transverse irradiance profiles may differ in this plane. For example, FIG. 3D shows that the transverse irradiance profile of the compensation light beam 118 (dashed line) has a nearly rectangular shape, that is, the local irradiance is substantially uniform over a limited spatial extent along the Y direction. This extent is bounded by steep edges that define, in an intuitive fashion, the width of the transverse irradiance profile of the compensation light beam 118. In turn, the curve sketched in solid line in FIG. 3D shows the more peaked, nearly Gaussian shape of the transverse irradiance profile of the triangulation light beam 120. It is seen that the centers of both transverse irradiance profiles in the plane of the object 110 nearly coincide, this situation being due to the fact that both triangulation 120 and compensation 118 light beams propagate collinearly up to the object 110. The coincidence of the centers of both transverse irradiance profiles is not a prerequisite to the method described herein. However, the width of the profile associated to the compensation light beam 118 should fully enclose the profile associated to the triangulation light beam 120. Optionally, the transverse irradiance profiles in the plane of the object 110 of both triangulation and compensation light beams do not change appreciably along the length of the luminous line formed on the object 110.

As depicted in FIG. 3B, a part of the illumination light beam 134 reflected off the surface of the object 110 is captured by the objective lens 122 and is then directed onto a spectrally-selective beamsplitter 128. The beamsplitter 128 splits the light beam 134 in two sub-beams 124 and 126 according to the different center wavelengths $\lambda_T$ and $\lambda_C$ of the triangulation 120 and compensation 118 beams which form the illumination light beam 134. Hence, a first sub-beam 126 of center wavelength $\lambda_T$ impinges on a first image sensing device 132 while a second sub-beam 124 of center wavelength $\lambda_C$ falls on a second image sensing device 130. This arrangement forms a pair of optical collection channels that allows the simultaneous acquisitions of two images, namely the images of the luminous lines formed on the object 110 by the superposition of the triangulation light beam 120 and compensation light beam 118. The spectrally-selective beamsplitter 128 can be identical to the beam combining element 106 in its various embodiments previously discussed. The photosensitive elements (pixels) of each image sensing device 130 or 132 are made up of a material that provides adequate sensitivity at the center wavelength of the sub-beam that impinges on their surface. Examples of image sensing devices 130 and 132 are CCD or CMOS image sensors. Both image sensing devices 130 and 132, the beamsplitter 128 and the objective lens can be integrated in a common assembly to form a type of dual-sensor camera.

Referring back to the schematic view of FIG. 3A, both triangulation 120 and compensation 118 light beams spread along the X direction to get the characteristic fan-shaped appearance of the light beams of common use in slit scanner instruments. The beam spreading can be carried out by transmitting both triangulation and compensation light beams through a cylindrical optical component 108, this component being oriented to have its refractive power in the XZ plane, as shown in FIG. 3A. The cylindrical component 108 can be realized, for example, with a single cylindrical lens of suitable focal length or, alternatively, with a lens system providing the desired refractive power along the X direction.

FIGS. 4A to 4D show an alternative embodiment for the triangulation system 100 that displays the same features as the embodiment illustrated in FIGS. 3A to 3D, except that both triangulation and compensation light beams spread along the X direction by using a pair of cylindrical components 140 and 142, each component being located downstream the dichroic beamsplitter 106. Alternatively, more sophisticated optical elements such as diffractive laser line generator lenses or a cylindrical lenses (for example a Powell lens) could be used in place of the cylindrical components 140 and 142.

FIGS. 5A to 5D depict the layout of another embodiment of the optical triangulation system 100 in which the optical collection channel includes a single image sensing device 150. In this embodiment, the images of the superposed luminous lines formed with the triangulation light beam 120 and the compensation light beam 118 are separated (temporally) from each other by implementing a type of time-multiplexing scheme, in which both light projectors 102 and 104 emit in alternate pulsed regime. Identical light projectors 102 and 104 can be used since both triangulation and compensation light beams may have the same center wavelength. In addition, a single image sensing device 150 is required in this scheme. Finally, this time-multiplexing scheme does not require the use of a beamsplitter 128 in the optical collection channel. This scheme then lends itself to optical set-ups with lower part counts, at the expense of more sophisticated electronics and controllers required for driving both light projectors 102 and 104 in pulsed regime and for synchronizing their emissions with the captures of the images performed by the image sensing device 150.

Alternatively, the implementation of a time-multiplexing scheme can be avoided by using different center wavelengths for the triangulation 120 and compensation 118 light beams in combination with a single color-sensitive image sensing device 150. In this embodiment, the image sensing device 150 may comprise an RGB color filter array such as the well-known Bayer filter while the center wavelengths are selected to correspond to the red, green or blue color. This means that each center wavelength is transmitted by only one of the three color filters. A single image of the superposed luminous lines can be acquired and then separated in two composite images of different colors, using image processing techniques routinely implemented in color cameras.

In the various embodiments of the triangulation system 100 illustrated in FIGS. 3, 4 and 5, the emissions of the light projectors 102 and 104 as well as the image captures performed by the image sensing devices 130, 132, and 150 can be controlled by a processing unit programmed for controlling such devices. Note that the processing unit is not shown in the figures. Likewise, the processing unit can be programmed to process the acquired images and to perform the various computation steps to be described in the next paragraphs.

Figure 6:
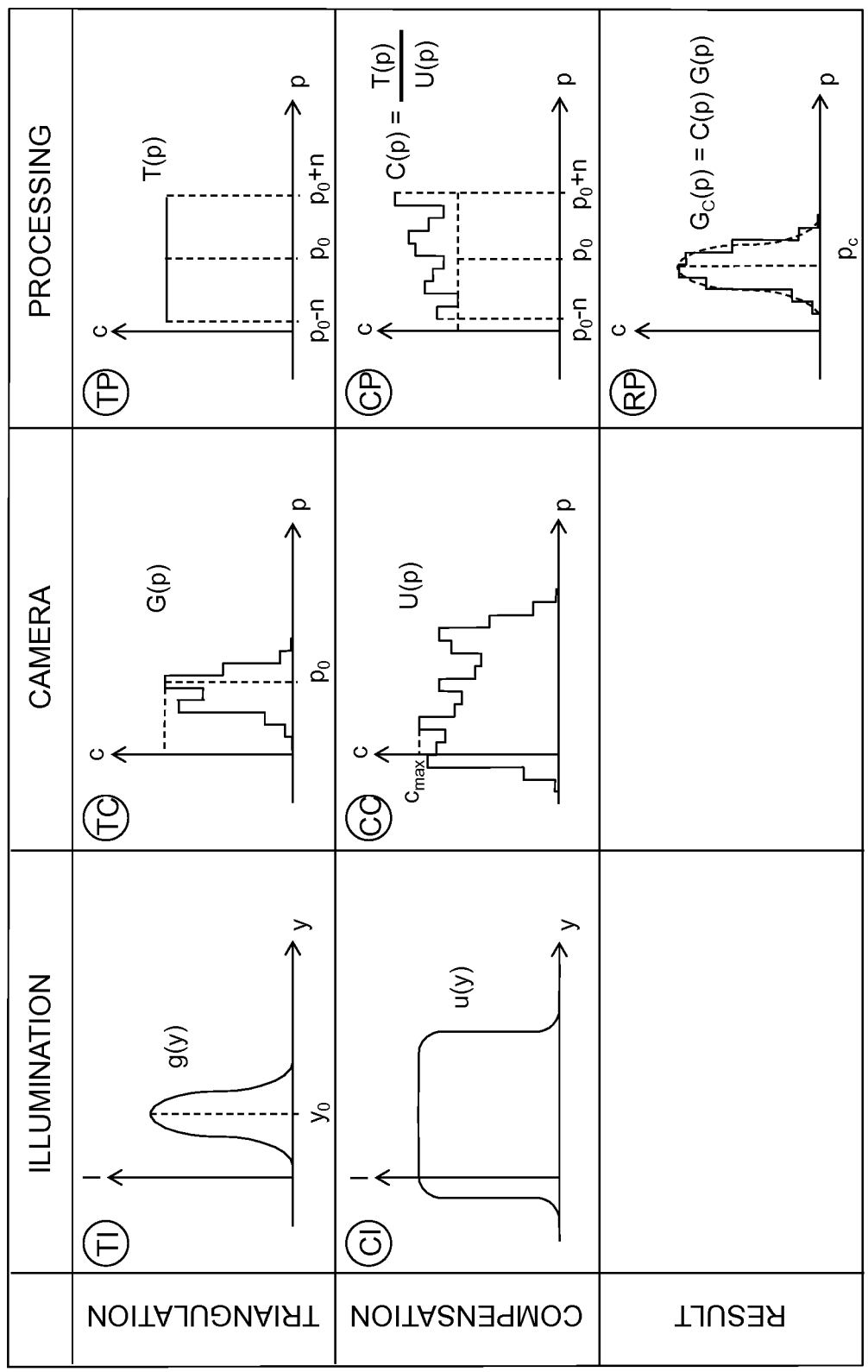
FIG. 6 is a schematic illustration of example steps of a method for compensating the spatial variations of the surface reflectance of an object mapped by a 3D optical triangulation system in which the compensation light beam has a rectangular-shaped transverse irradiance profile.

FIG. 6 describes graphically example steps of the method for compensating the spatial variations of the surface reflectance of an object. Note that the steps detailed herein hold for the case of a compensation light beam 118 having a substantially rectangular transverse irradiance profile, such as the one depicted in dashed line in FIG. 3D. The nearly-Gaussian profile g(y) depicted in box TI of FIG. 6 refers to the transverse irradiance profile of the triangulation light beam 120 incident on the object 110. Likewise, the transverse irradiance profile of the compensation light beam 118 incident on the object 110 is depicted schematically by the profile u(y) shown in box CI. As mentioned earlier, u(y) is set wider than the nearly-Gaussian profile g(y). Both transverse irradiance profiles are assumed to remain substantially unchanged along the length of the luminous line formed by the superposition of both beams on the object 110. Since both profiles g(y) and u(y) refer to incident irradiance profiles, they do not exhibit any distortion caused by the small-scale reflectance variations over the zone of the object's surface that is illuminated. Both profiles then appear smooth and continuous. The variable y in both graphs of boxes TI and CI relates to the corresponding spatial direction Y as illustrated in FIG. 3A, this direction being parallel to the width of the luminous lines formed on the object 110.

Boxes TC and CC of FIG. 6 illustrate exemplary images of the segment of the luminous line formed on the object 110 by the segments of the triangulation and compensation light beams having the transverse irradiance profiles as shown in boxes TI and CI, respectively. Stated otherwise, the profiles G(p) and U(p) shown in boxes TC and CC are exemplary discretized representations of both transverse irradiance profiles g(y) and u(y) after their individual reflection on the specific zone of the object's surface that is illuminated by these irradiance profiles. The variable p on the horizontal axis of the graphs shown in boxes TC and CC is expressed in pixel units, the pixels corresponding to the photosensitive elements of the image sensing devices 130 and 132 shown in FIG. 3B. The size of the pixels then determines the piecewise-continuous, discrete appearance of the profiles G(p) and U(p). Note that the widths of the profiles g(y) and u(y) are such that the images of both profiles formed on the devices 130 and 132 cover only a few pixels, thus making the discrete nature of the imaged profiles G(p) and U(p) more evident. Keeping the luminous line formed on the object 110 very thin enables high-resolution 3D optical profiling.

The presence of small-scale reflectance variations within the zone of the object's surface illuminated by the transverse irradiance profiles g(y) and u(y) causes the ragged shapes of both imaged profiles G(p) and U(p), as clearly illustrated in boxes TC and CC of FIG. 6. In particular, the distortions in the imaged profile G(p) associated to the triangulation light beam 120 can be such that the evaluation of its center position $p_0$ is prone to sizable errors. For instance, the pixel $p_0$ on which is located a center position determined from the distorted profile G(p) may differ appreciably from the pixel position on which the precise center position $y_0$ of the incident transverse irradiance profile g(y) would normally be imaged. Due to the substantially rectangular shape of the transverse irradiance profile u(y) of the compensation light beam 120, the shape of the corresponding distorted profile U(p) can be thought of as a replica of the local reflectance variations of the object's surface illuminated by u(y). The example method makes use of the local reflectance variations replicated on U(p) to wash them out from the distorted triangulation profile G(p).

The example steps for the processing of the distorted, discrete profiles G(p) and U(p) are illustrated schematically in boxes TP, CP, and RP of FIG. 6. The processing starts by first determining an effective window T(p) from the profile G(p) originating from the reflection of the triangulation light beam 120 on the object 110. The effective window serves to isolate the pixels of the image sensing device 132 that are effectively illuminated by the light reflected by the object 110 and received on the device. As a result, the width of T(p) is intimately linked to the estimated width of the profile G(p). For instance, T(p) can be evaluated by retaining the pixels of G(p) having pixel counts that exceed a minimum count level, for example, by retaining only the pixels that received a light irradiance level higher than a predetermined threshold. For convenience, the center of the effective window can be made coincident with the pixel position $p_0$ on G(p), where the highest count level has been recorded. Alternatively, more sophisticated approaches can be used for centering T(p) when the distortions observed on the profile G(p) are such that the estimation of its center position is severely impaired. Box TP shows that the effective window T(p) occupies n pixels on either side of the center pixel position $p_0$ in the present example, for a total of 2n+1 pixels.

The next example step proceeds with the computation of a compensation function C(p) from the reciprocal of the distorted profile U(p) associated to the reflection of the compensation light beam 118. The resulting profile 1/U(p) can get very high values for pixel positions at which very low pixel counts were recorded. This situation can be solved by subsequently taking the product (pixel by pixel) of the profile 1/U(p) with the effective window function T(p) determined in the previous step. The result of this operation is the compensation function C(p), an example being illustrated in the graph of box CP of FIG. 6. The last example step of the processing then consists in taking the product (pixel by pixel) of the distorted triangulation profile G(p) with the compensation function C(p) to recover a discretized triangulation profile $G_C(p)$ that is relatively free from the adverse effects of the reflectance variations of the object's surface on a scale that compares to the width of the profile. The profile $G_C(p)$ is sketched in solid line in the graph of box RP of FIG. 6 while the curve in dashed line shows, for comparison, a replica of the undistorted, incident triangulation profile g(y). The profile $G_C(p)$ will be referred to as the compensated triangulation profile. A center position $p_C$ can then be determined on the profile $G_C(p)$. The offset between the center position $p_C$ and the position on which the center $y_0$ of the profile g(y) would be imaged on the image sensing device should usually be lower than the corresponding offset between the center position $p_0$ of the distorted profile G(p) and the image position of $y_0$.

The method described above holds for the distorted triangulation G(p) and compensation U(p) profiles recorded along any given position x along the length of the luminous line generated on the surface of the object 110. A centerline, describing the variations of the center position $p_C$ along the line length, can be built by repeating the method for each individual position along the line length, the number of positions being given simply by the number of pixels $N_P$ of the image sensing devices 130 and 132 comprised within the full length of the image of the luminous line. The centerline can be conveniently represented by an one-dimensional array or vector of center positions $p_C(x_i)$ (i=1, 2, 3, ... $N_p$), wherein the index i relates to the rank of the pixel on which is imaged a corresponding position x along the line length. The centerline $p_C(x)$, compensated for the variations of the reflectance of the object's surface, can then be used for inferring the changes in the topography of the object over the zone illuminated by both triangulation and compensation light beams.

Figure 7:
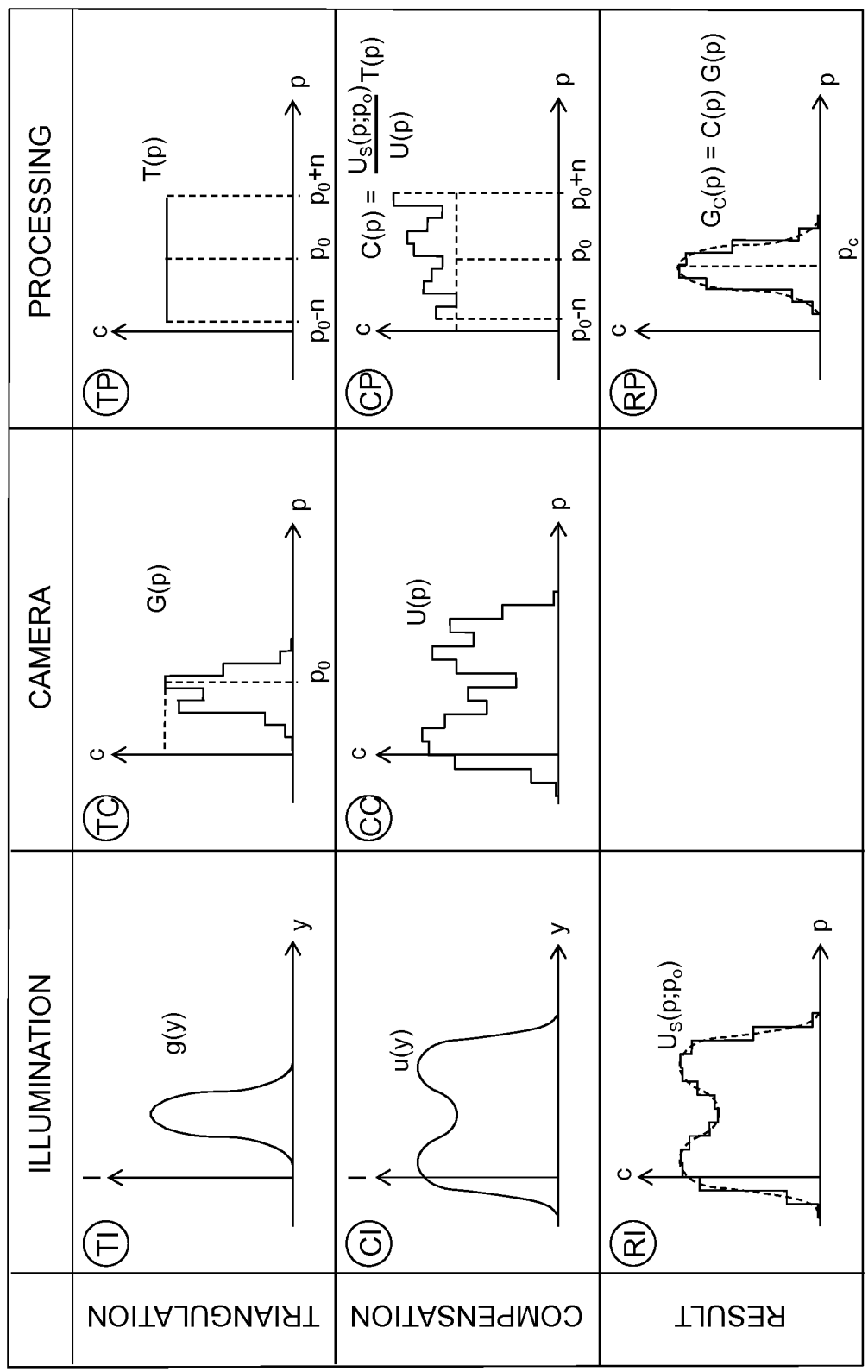
FIG. 7 is a schematic illustration of example steps of a method of more general application for compensating the spatial variations of the surface reflectance of an object mapped by a 3D optical triangulation system in which the transverse irradiance profile of the compensation light beam is not rectangular shaped.

FIG. 7 illustrates example steps of a method suited for the more general situation in which the transverse irradiance profile u(y) of the compensation light beam 118 incident on the surface of the object 110 does not have a substantially rectangular shape. For instance, box CI of FIG. 7 shows an example of a double-lobed transverse profile u(y) wherein the local irradiance varies significantly over the width of the profile. As compared to the previous case, an additional step is carried out in which the image of the profile u(y) is sampled in pixel units p in the course of a previous system calibration run, to give the sampled, discrete profile $U_S(p;p_0)$. Further details about the system calibration run will be given below with reference to the description of FIG. 8A. Box RI of FIG. 7 illustrates the profile $U_S(p;p_0)$ in solid line. Box CP of FIG. 7 shows that the formula for computing the compensation function C(p) is nearly the same as previously shown in box CP of FIG. 6, except for the presence of the factor $U_S(p;p_0)$ in the numerator of the formula.

Prior to using it in the compensation function C(p), the profile $U_S(p;p_0)$ may need to be shifted horizontally to make its center position coincident with the estimate $p_0$ of the center position of the distorted transverse profile G(p) associated to the triangulation light beam 120. Hence, the estimate $p_0$ carries an uncertainty due to the fact that it is determined from the distorted triangulation profile G(p), prior to compensation. The uncertainty on $p_0$ then leads to a corresponding uncertainty on the horizontal shift of the profile $U_S(p;p_0)$, thus possibly impairing the effectiveness of the compensation. Fortunately, the adverse effects of these related uncertainties can be reduced by implementing an iterative approach in which a suite of estimates $p_0$ is determined by progressively compensating the distorted triangulation profile to give a refreshed value of $p_0$, which will then serve to perform the next horizontal shift of the profile $U_S(p;p_0)$, and so on.

The shape of the sampled profile $U_S(p;p_0)$ generated from the compensation light beam 118 is likely to vary along the length of the image of the luminous line. This situation then commands for sampling $U_S(p;p_0)$ at various positions x along the image of the luminous line. In a simple approach, the sampled profile $U_S(p;p_0)$ to be used for a given position $x_T$ along the length of the imaged luminous line can be chosen as the profile $U_S(p;p_0)$ sampled at the position $x_C$ closest to the position $x_T$. Note that, in practice, the samplings along the length of the luminous line are generally not exactly the same since the individual luminous lines formed by the triangulation and compensation light beams are imaged on two separate image sensing devices in some embodiments of the triangulation system. For better accuracy, the sampled profile $U_S(p;p_0)$ to be used for a given position $x_T$ can be obtained by locally interpolating the profiles $U_S(p;p_0)$ recorded along the full length of the luminous line. The set of sampled profiles $U_S(p;p_0)$ for the compensation light beam 118 recorded during the calibration run could be stored in a look-up table. Alternatively, they can be represented by an analytical expression based on a set of numerical parameters, the values taken for each parameter in a given set defining the sampled profile $U_S(p;p_0)$ valid for any specific position along the length of the luminous line.

Simulation test runs were carried out to determine the impacts of using the compensated triangulation method described herein. In a test case, the RMS (root-mean-squared) error on the determination of a centerline reached 6.835 μm without any action to compensate for the surface reflectance variations. On the other hand, performing the compensation method as described above resulted in an RMS error on the centerline reduced to 3.829 μm. Experimental tests have been carried out after having performed a relatively coarse calibration run of an optical triangulation system. The use of the compensation method allowed the standard deviation on the measured centerline to decrease from 5.5 μm down to 3.48 μm.

FIG. 8A shows an example set-up for carrying out the calibration with sampling of the transverse irradiance profile u(y) of the compensation light beam 118. The light projector 200 projects a fan-shaped illumination beam 202 onto a flat reference plane 204 to produce the luminous line 206. The error caused by a lack of planarity of the reference plane 204 is negligible when compared to the accuracy of the 3D profiler system. The reference plane 204 has a microstructure 208 which reflects a portion of the incident light towards the camera objective lens 210. This microstructure 208 is such that it does not produce any easily-detectable variation of the effective reflectance of the reference plane 204, even when using an illumination beam 202 having a low étendue.

The maximum height of the elements of the microstructure 208 should be significantly lower than the height resolution of the 3D profiler system, so that the change in surface height at the location of the microstructure cannot be detected in the images from the camera sensor. The reference plane 204 could bear fiducial marks (not shown in FIG. 8A) for referencing of the positions along the length of the projected line 206, that is, along the X axis in FIG. 8A. The fiducial marks or distinctive features help in mapping the positions along the X axis in the reference plane 204 to the corresponding image positions in the image sensor plane 212.

The reference plane 204 is moved upwardly in increments along the detection axis (the Z axis in FIG. 8A) of the 3D profiler system. This detection axis is typically included in the plane defined by the optical axes of the light projector 200 and of the image sensing system (represented schematically in FIG. 8A by the objective lens 210 and the image sensor 212). An image 214 of the luminous line 206 formed on the reference plane 204 and caused by the illumination light beam 202 is captured by the image sensor 212 for each incremental height of the reference plane 204.

FIGS. 8B and 8C are close-up views of short segments of the image 214 of the luminous line 206 taken for two well-spaced locations A and B, respectively, along the length of the line. The transverse irradiance profiles along the cross-sectional lines A-A' and B-B' and incident on the image sensor 212 are depicted in FIGS. 8D and 8E for the triangulation and compensation light beams, respectively, both light beams being superposed to form the illumination light beam 202. For simplicity, a single light projector 200 is assumed to emit both light beams in FIG. 8A. FIGS. 8D and 8E show that the exact shapes of the transverse irradiance profiles may vary appreciably along the length of the line 206, thus requiring that the calibration procedure be performed at various positions along the line length.

At each incremental height of the reference plane 204, the characteristic center position of the imaged transverse profile of the triangulation light beam is determined using the same algorithms as for the actual triangulation measurements. This task is carried out for each location along the length of the line. This task then yields the correspondence between the positions in the reference plane 204 and the characteristic center positions in the plane of the image sensor 212, this correspondence being dependent upon the height of the reference plane 204, that is, its position along the Z axis in FIG. 8A. This correspondence is an implicit model and it is used for the determination of the shape of the object's surface as sensed by the 3D profiler system, using an interpolation scheme or a polynomial best fit on the calibration data. In turn, the imaged transverse profiles of the compensation light beam are simply digitized and stored in memory as is or after conversion into a compact mathematical representation for later use the way as explained in the description of FIG. 7.

The method for compensating for the adverse effects of the small-scale reflectance variations over the surface of an object to be mapped with an optical triangulation system is not limited to systems of the slit-scanner type. For example, the method can also be implemented in flying-spot scanners, wherein the object's surface is mapped by scanning a tiny light spot instead of a thin luminous line. The basic set-ups for integrating the method in a flying-spot scanner can be similar to the embodiments depicted in FIG. 3, 4 or 5, the primary difference being the absence of optical cylindrical component(s) for converting the light beams radiated from the light projectors into fan-shaped beams. FIG. 9A illustrates an exemplary embodiment of a flying-spot scanner system 300 that includes two light projectors 302 and 304. The projector 302 generates a triangulation light beam 308 while the projector 304 emits the compensation light beam 310. Both light beams propagate along a common propagation axis using a dichroic beamsplitter 306 to create the illumination light beam 312. The illumination light beam 312 has a circular cross-section, which produces either a circular or elliptical light spot 314 centered at point C on the object's surface 316. A cross-sectional cut through the light spot 314 would reveal, as shown in FIG. 9B, the Gaussian-shaped transverse irradiance profile of the triangulation light beam 308 (dashed line) on which is superposed the wider, rectangular-shaped profile of the compensation light beam 310 (solid line). FIG. 9B clearly shows that the local irradiance of the compensation light beam 310 is very uniform over the zone lit by the Gaussian-shaped triangulation light beam 308. A part of the light spot 314 is reflected by the object's surface 316 in a direction 320 towards the objective lens 330 to form an image 328 centered at point C' in the plane of the image sensing device 324. The image sensing device 324 and the objective lens 330 can be part of a camera assembly oriented in such a way that the image of a point D on the object's surface 316 located on the camera's optical axis 322 is formed at point D' on the image sensing device 324.

A unidirectional or bidirectional beam scanning system can be included in the flying-spot instrument 300 to allow mapping of the object's surface 316 along a single line or over a two-dimensional surface area. The beam scanning system can include mirrors or other optical deflection means that can rotate about a single axis or about two axes perpendicular to each other. The beam scanning system should allow sweeping of the illumination light beam 312 over the surface of the object and it can also include control of the line of sight of the image-capture equipment to enable continuous tracking of the light spot position C on the object's surface 316.

Additional light projectors can be integrated in the embodiments of the compensated triangulation systems illustrated in FIG. 3, 4, 5 or 9 to allow simultaneous acquisitions on a plurality of luminous lines or spots. Likewise, in other embodiments of the systems the illumination light beam can be split into a plurality of replicas by using suitable beam-splitting optics such as diffractive optical elements to create multiple luminous spots or lines on the object's surface to be mapped.

The embodiments described above are intended to be exemplary only. The scope of the invention is therefore intended to be limited solely by the appended claims.

We claim:

1. A method for determining a centerline for a triangulation-based optical profilometry system, said method compensating for spatial variations of reflectance of a surface of an object to be scanned with said triangulation-based optical profilometry system, said method comprising:
   providing a luminous line on said surface of said object, said luminous line being a superposition of a triangulation luminous line generated by a triangulation light beam with a compensation luminous line generated by a compensation light beam, said triangulation light beam and said compensation light beam being collinear, said triangulation light beam having a lower étendue than said compensation light beam, said triangulation light beam having a nearly Gaussian irradiance profile along a transverse dimension;
   capturing a triangulation image of said triangulation luminous line, said triangulation image including an imaged triangulation luminous line;
   capturing a compensation image of said compensation luminous line, said compensation image including an imaged compensation luminous line;
   for each of a plurality of different positions defined along a length of said imaged triangulation luminous line,
      determining a transverse triangulation profile from said imaged triangulation luminous line;
      determining a transverse compensation profile from said imaged compensation luminous line;
      determining a transverse correction profile by calculating the reciprocal of said transverse compensation profile;
      multiplying said transverse triangulation profile with said transverse correction profile to obtain a corrected transverse triangulation profile;
      computing a center of said corrected transverse triangulation profile and storing said center in a vector; and
   determining said centerline for said triangulation-based optical profilometry system from said vector.

2. The method as claimed in claim 1, wherein said providing said luminous line includes projecting said luminous line, wherein said triangulation light beam is emitted by a triangulation light projector and said compensation light beam is emitted by a compensation light projector.

3. The method as claimed in claim 1, wherein said triangulation light beam and said compensation light beam are combined using a beam combining element.

4. The method as claimed in claim 2, wherein said triangulation light beam and said compensation light beam are emitted according to a time-multiplexing scheme.

5. The method as claimed in claim 1, wherein said triangulation light beam and said compensation light beam have different center wavelengths.

6. The method as claimed in claim 1, wherein said capturing said triangulation image comprises optically filtering said triangulation image to reject said imaged compensation luminous line from said triangulation image, and wherein said capturing said compensation image comprises optically filtering said compensation image to reject said imaged triangulation luminous line from said compensation image.

7. The method as claimed in claim 6, wherein said optically filtering said triangulation image and said optically filtering said compensation image are performed using a spectrally-selective beamsplitter.

8. The method as claimed in claim 1, wherein said capturing said triangulation image of said triangulation luminous line and said capturing said compensation image of said compensation luminous line are performed using respective triangulation image sensor and compensation image sensor.

9. The method as claimed in claim 1, wherein said capturing said triangulation image of said triangulation luminous line and said capturing said compensation image of said compensation luminous line are performed using a single image sensor according to a time-multiplexing scheme controlling said single image sensor.

* * * * *